Aug. 11, 1959  J. J. JACOBSON  2,898,692

DISPLAY AND DEMONSTRATION DEVICE

Filed Sept. 3, 1957  2 Sheets-Sheet 1

INVENTOR.
James J. Jacobson
BY Edwin Levisohn
Harry Cohn
ATTORNEYS

Aug. 11, 1959  J. J. JACOBSON  2,898,692
DISPLAY AND DEMONSTRATION DEVICE
Filed Sept. 3, 1957  2 Sheets-Sheet 2
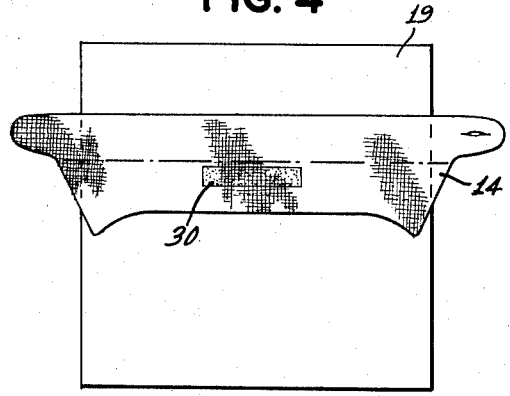
FIG. 4
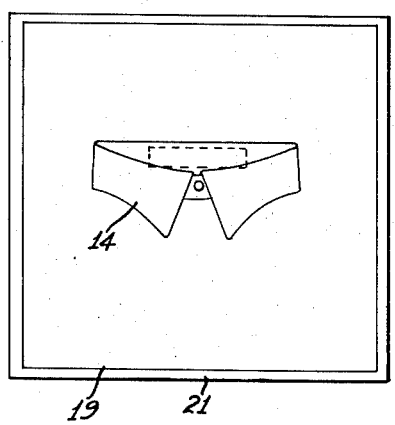
FIG. 5
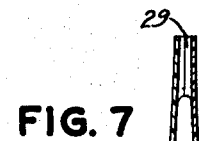
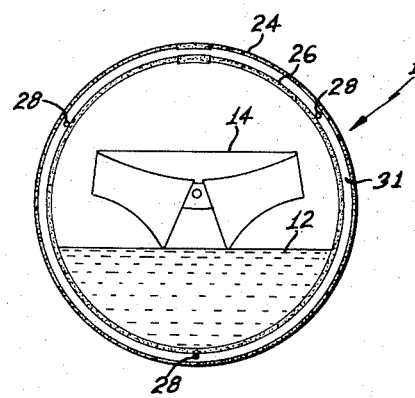
FIG. 8
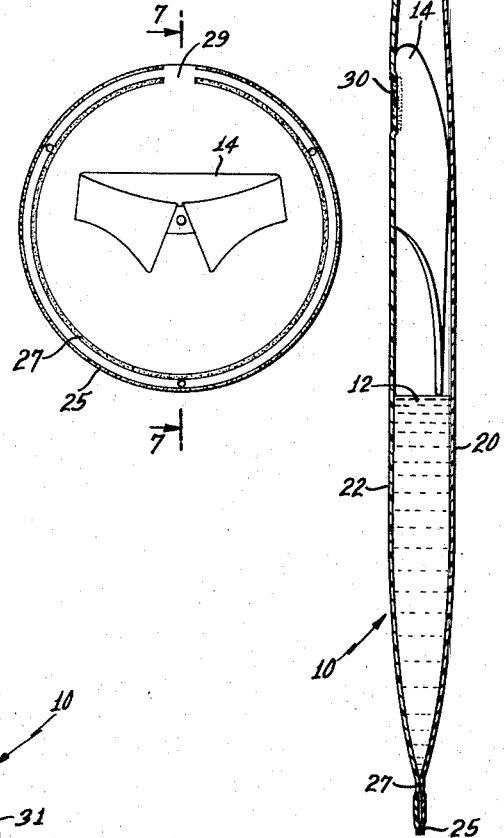
FIG. 6
FIG. 7
INVENTOR.
James J. Jacobson
BY Edwin Levsoh
Harry Cohn
ATTORNEYS

United States Patent Office 2,898,692
Patented Aug. 11, 1959

2,898,692

DISPLAY AND DEMONSTRATION DEVICE

James J. Jacobson, New York, N.Y.

Application September 3, 1957, Serial No. 681,639

9 Claims. (Cl. 35—49)

The present invention relates to a display and demonstration device.

According to the present invention there is provided a device which is especially well suited for demonstrating the effect of subjecting an article to contact with a liquid or a quality of a particular article related to the action of a liquid thereon. For example, in the case of soft collars of the type generally used on men's shirts, there has always been the problem of preventing wrinkling and the impairment of the appearance of the collar due to perspiration. According to the present invention, there is provided a device which is highly effective to demonstrate the resistance of an article or a fabric to the action of a liquid. Toward that end, a collar, for example, is mounted within a fluid tight compartment partially filled with a liquid. Mounting means are then provided to rotate said compartment whereby the article therein is repeatedly moved into and out of the liquid, and the compartment has a transparent front wall so that the results can easily be observed.

It is therefore a primary object of the present invention to provide a display and demonstration device for displaying an article and for demonstrating the resistance of the article to a liquid.

Another object of the present invention is the provision of a display and demonstration device which is simple in construction, inexpensive to manufacture, durable, convenient to set up for use, and especially well adapted to attention and to furnish an emphatic and convincing test-demonstration of the liquid-resistant property of an article.

The above and other objects, features and advantages of the present invention will be more fully understood from the following description, considered in connection with the accompanying illustrative drawings, which are descriptive and illustrative of the presently preferred embodiment of the present invention.

In the drawings:

Figs. 4–6 are front views illustrating the method of making the fluid tight compartment shown in Fig. 8;

Fig. 7 is a sectional view, taken along the line 7—7 of Fig. 6;

Fig. 8 is a plan view of the fluid tight compartment;

Figure 1:
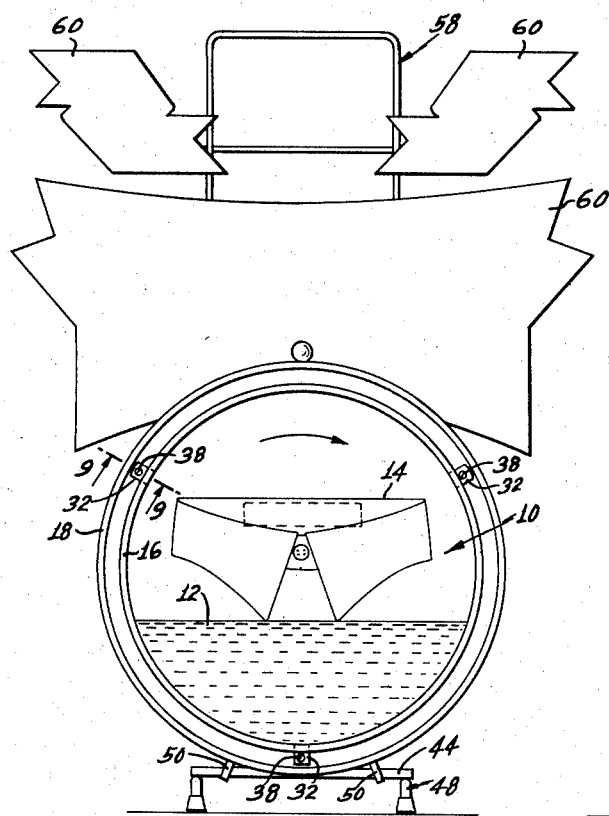
Fig. 1 is a front view of the display and demonstrating device.
Figure 2:
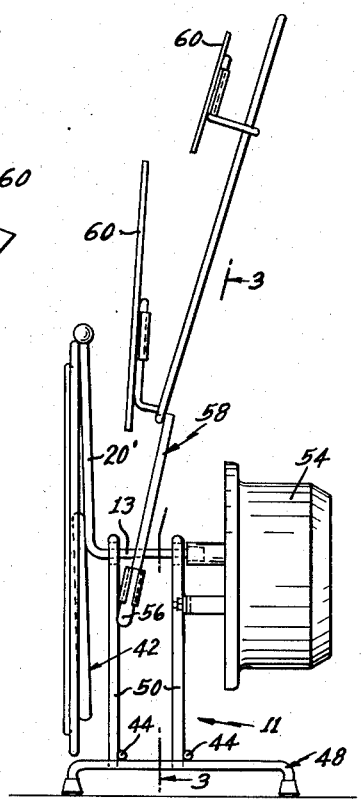
Fig. 2 is a side view thereof.
Figure 3:
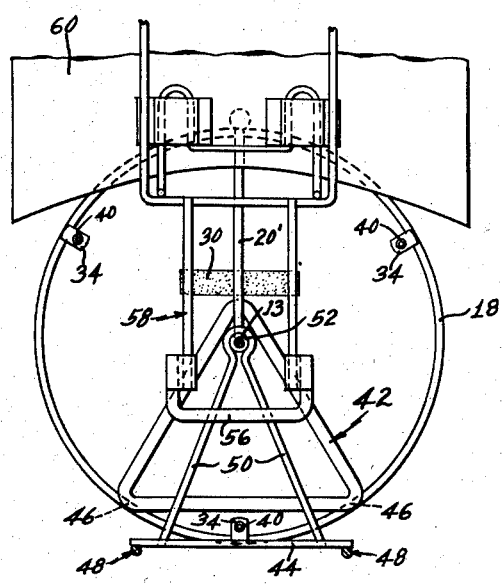
Fig. 3 is a cross sectional view taken along line 3—3 of Fig. 2.
Figure 9:
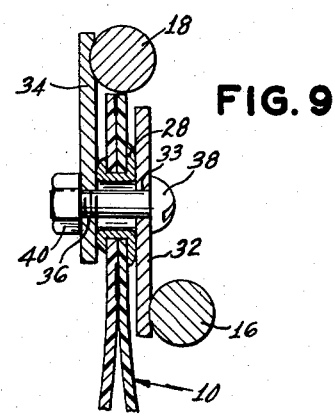
Fig. 9 is a sectional view, on an enlarged scale, taken along line 9—9 of Fig. 1.

Referring now to the drawings in detail, the display and demonstrating device of the present invention comprises a vertically disposed compartment 10 partially filled with a liquid 12 and having mounted therein a collar 14. Compartment 10 is mounted between frame members 16 and 18 and said frame members are secured to a shaft 13 which is mounted for rotation on supporting stand 11 to permit rotation of compartment 10 about its central horizontal axis as will hereinafter be described in greater detail. As is apparent from Fig. 1, the turning of said compartment about its horizontal axis will cause collar 14 therein to come into and out of contact with the liquid 12.

Compartment 10 (Figs. 7 and 8) comprises a front wall 20 and a rear wall 22. Each of said walls is made of flexible plastic sheet material, preferably a vinyl plastic, and front wall 20 is transparent so that the contents of the compartment may readily be observed through said front wall. Walls 20 and 22 are connected to each other in fluid tight relation along peripherally extending line 24 which defines the periphery of compartment 10, and along line 26 which is concentric with line 24 and spaced inwardly therefrom thus forming a double fluid tight seal. Compartment 10 is provided with spaced eyelets 28 secured thereto in the space 31 between lines 24 and 26 for mounting said compartment between frame members 16 and 18.

The method of making said compartment will now be described with particular reference to Figs. 4–7. The unbuttoned collar 14 is secured to a panel 19 of plastic sheet material by sealing the collar thereto as at 30 by heat and pressure, the heat-softened plastic flowing into the interstices of the collar material and the collar thus being fused to the plastic panel. The collar is then buttoned to assume its normally worn condition and a panel 21 of transparent plastic sheet material is superposed on panel 19 with collar 14 disposed therebetween. Panels 19 and 21 are secured to each other by heat sealing along circular concentric lines 25 and 27 leaving a small portion 29 unsealed. The outer seal has a tear edge formed outwardly thereof during the sealing operation for removal of the excess material beyond the outer seal. Unsealed portion 29 defines a temporary opening into compartment 10 through which there is introduced distilled water treated with a suitable fungicide which is inert to polymers of the vinyl family and which will not discolor the article mounted in the compartment. I have found that dodecyl dimethyl benzyl ammonium cyclopentane carboxylate salt which is the active ingredient of a preparation sold under the trademark "Nuodex" by Nuodex Products Company, Newark, New Jersey, is highly effective as a fungicide in this invention. As best seen in Figure 7 and 8, compartment 10 is only partially filled with water, the water level reaching immediately below the points of the collar when the compartment is in a predetermined position wherein the collar is oriented in the normal worn condition thereof. In addition to the liquid, a small quantity of air is introduced in the compartment, after which opening 29 is sealed to render compartment 10 completely fluid tight. In said completely sealed condition, compartment 10 may be moved into various positions to permit the collar 14 to move into and out of contact with the liquid. The air in the compartment prevents walls 20 and 22 from adhering to each other above the liquid level.

As stated earlier, compartment 10 is secured between ring shaped frame members 16 and 18. The circumference of frame member 16 is approximately the same as that of inner seal 26 of compartment 10 and said frame member is provided with spaced outwardly extending tabs 32 having holes 33 alignable with eyelets 28 on the compartment. The circumference of frame member 18 is approximately the same as that of compartment 10 and is provided with spaced inwardly extending tabs 34 having holes 36 alignable with eyelets 28 of the compartment 10 and with holes 33 of frame member 16. Threaded studs 38 extend through corresponding holes 33, eyelets 28, and holes 36, and nuts 40 are provided to releasably clamp compartment 10 between frame members 16 and 18. A triangular shaped counterweight 42 is secured to frame member 18 in the lower rear part thereof as by welding at vertices 46 of the counterweight. Counterweight 42 biases frame member 18 to a predetermined position thereof so that the compartment carried by said frame member is oriented in said previously described predetermined position thereof wherein the collar is disposed in the normal worn condition and in which the liquid level reaches immediately below the points of the collar.

Supporting stand 11 comprises a base 48 having a pair of spaced transversely extending cross members 44 and upwardly extending frame members 50 which house bearings 52 in the upper portions thereof. A horizontal shaft 13 is mounted for rotation in said bearings, and said shaft has an upwardly extending part 20' at one end thereof secured to counterweight 42 and to frame member 18. The axis of rotation of shaft 13 is coincident with the central horizontal axis of frame member 18 and it is therefore seen that compartment 10 which is carried by said frame member is rotatable by said shaft in a vertical plane.

Accordingly, when compartment 10 is mounted on stand 11 as described above, it is freely rotatable in a vertical plane, and said compartment may be manually given an initial angular displacement which will cause said compartment to oscillate about a vertical axis due to the effect of counterweight 42. Said counterweight will also cause the compartment to return to its predetermined position once the oscillations have ceased.

A small motor 54 is removably mounted on supporting stand 11 and is operatively connected to shaft 20 for imparting thereto continuous or intermittent rotation, as may be desired. One of the frame members 50 of supporting stand 11 may be provided with a bracket 56 for supporting a removable wire frame structure 58, said structure being adapted to support cards 60 which carry printed matter of an advertising or explanatory nature.

It will be understood that while the device embodying the present invention has been described in connection with the demonstration of the effect of water on a collar, said device may be used for demonstrating the effect of any liquid on any article. Thus, for example, the device could be used to demonstrate a particular textile's resistance to chlorine destructiveness, or the device could be used to demonstrate the effect of a particular fluid on two different articles for purposes of comparison.

Thus it is seen that the display and demonstrating device described above with reference to the accompanying drawings is well adapted to accomplish the several objects of the present invention. It will be understood, however, that certain changes may be made without departing from the underlying idea of this invention. Accordingly, I do not wish to be limited to the specific construction herein shown or described, except, as may be required by the scope of the appended claims.

Having thus described my invention, what I claim and desire to secure by Letters Patent is:

1. A demonstration and display device, comprising, means defining a compartment, an article mounted within said compartment, said compartment also having a liquid therein for contact with said article in at least one position of the compartment, said liquid being out of contact with said article in at least another position of the compartment, said compartment having a part which is sufficiently transparent to enable observation of said article and the liquid therein, and means for mounting said compartment defining means for movement to different positions for bringing said liquid into and out of contact with said article.

2. A demonstration and display device, comprising, means defining a compartment, an article mounted within said compartment, said compartment also having a liquid therein for contact with said article in at least one position of the compartment, said compartment having a part which is sufficiently transparent to enable observation of said article and the liquid therein, and means for mounting said compartment defining means for movement to different positions for bringing said liquid into and out of contact with said article, said compartment defining means being turnable about a horizontal axis and said compartment being only partially filled with said liquid and said article being disposed out of contact with said liquid in at least another position of the compartment defining means whereby turning of said compartment defining means about said axis causes said article to move into and out of said liquid, for demonstrating the result of subjecting said article to said contact with said liquid.

3. A demonstration and display device, comprising, means defining a compartment, an article mounted within said compartment, said compartment also having a liquid therein for contact with said article in at least one position of the compartment, said compartment having a part which is sufficiently transparent to enable observation of said article and the liquid therein, and means for mounting said compartment defining means for movement to different positions for bringing said liquid into and out of contact with said article, said compartment defining means comprising a front and rear vertical wall, one of said walls having a part formed of a plastic and said article being fused to said plastic on the inner surface of said part and thereby supported in position in said compartment.

4. A demonstration and display device, comprising, means defining a compartment, an article mounted within said compartment, said compartment having a liquid therein for contact with said article in at least one position of the compartment, said compartment having a part which is sufficiently transparent to enable observation of said article and the liquid therein, said compartment defining means comprising front and rear vertically extending walls directly connected to each other in fluid tight relation along a peripherally continuous line defining the periphery of said compartment, said article being mounted directly on and in fixed relation with one of said walls in position between the two walls and free from attachment to said other wall, said compartment being only partially filled with said liquid and said article being disposed at least partly above the liquid level in a predetermined stationary position of the compartment defining means whereby the liquid in said compartment can be brought into and out of contact with said article by moving said compartment defining means to and from said predetermined position to a different position, while the movement of the liquid into and out of contact with said article is observed.

5. A demonstration and display device, comprising, means defining a compartment, an article mounted within said compartment, said compartment also having a liquid therein for contact with said article in at least one position of the compartment, said compartment having a part which is sufficiently transparent to enable observation of said article and the liquid therein, and means for mounting said compartment defining means for movement to different positions for bringing said liquid into and out of contact with said article, said compartment defining means having front and rear vertical walls and said article being fixedly mounted in position between said walls, said compartment defining means being turnable about a horizontal axis and said compartment being only partially filled with said liquid and said article being disposed at least partly above the liquid level in a predetermined stationary position of the compartment defining means whereby turning of said compartment defining means about said axis causes said article to move into and out of said liquid for demonstrating the result of subjecting said article to said contact with said liquid, said walls being sealed to each other in fluid tight relation, at least one of said walls being flexible and said compartment having air therein for spacing said walls from each other above the liquid level.

6. A demonstration and display device, comprising, means defining a compartment, an article mounted within said compartment and in fixed relation thereto, said compartment also having a liquid therein for contact with said article in at least one position of the compartment, said compartment having a part which is sufficiently transparent to enable observation of said article and the liquid therein, and means for mounting said compartment defining means for movement to different positions for bringing said liquid into and out of contact with said article, and means operatively connected to said compartment defining means for biasing the latter to a predetermined position in which the article is in a predetermined position in relation to the liquid in said compartment.

7. A demonstration and display device, comprising, means defining a compartment, an article mounted within said compartment, said compartment also having a liquid therein for contact with said article in at least one position of the compartment, said compartment having a part which is sufficiently transparent to enable observation of said article and the liquid therein, and means for mounting said compartment defining means for movement to different positions for bringing said liquid into and out of contact with said article, said mounting means comprising a frame, a horizontal shaft mounted for rotation by said frame, and a pair of concentric ring shaped frame members securing said compartment defining means in vertical position therebetween, one of said ring shaped frame members being operatively secured to said shaft whereby said compartment defining means is rotatable by said shaft in a vertical plane.

8. A demonstration and display device, comprising, a rear wall made of a flexible plastic sheet material, a front wall made of a flexible transparent sheet material and having the same shape as said rear wall, said walls being secured to each other along their contour edges in fluid sealing relation and defining a compartment therebetween, an article disposed in said compartment and fixedly secured to said rear wall, said compartment being partially filled with a liquid substance and with air whereby said article is immersable in said liquid substance, by movement of said device and said walls are in spaced relation inwardly of said contour edges.

9. A demonstration and display device, comprising, means defining a compartment, an article mounted within said compartment, said compartment also having a liquid therein for contact with said article in at least one position of the compartment, said compartment having a part which is sufficiently transparent to enable observation of said article and the liquid therein, and means for mounting said compartment defining means for movement to different positions for bringing said liquid into and out of contact with said article, said mounting means comprising a frame, a horizontal shaft mounted for rotation by said frame, and a pair of frame members securing said compartment defining means in vertical position therebetween, one of said frame members being operatively secured to said shaft whereby said compartment defining means is rotatable by said shaft in a vertical plane.

References Cited in the file of this patent

UNITED STATES PATENTS

| 1,262,673 | Hutton | Apr. 16, 1918 |
| 1,921,692 | Morgan | Aug. 8, 1933 |
| 2,147,384 | Salfisberg | Feb. 14, 1939 |
| 2,707,839 | Green | May 10, 1955 |